US007404656B2

(12) United States Patent
Oyama

(10) Patent No.: US 7,404,656 B2
(45) Date of Patent: Jul. 29, 2008

(54) VEHICLE LIGHT

(75) Inventor: Hiroo Oyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 57 days.

(21) Appl. No.: 11/275,759

(22) Filed: Jan. 27, 2006

(65) Prior Publication Data

US 2006/0171161 A1 Aug. 3, 2006

(30) Foreign Application Priority Data

Jan. 28, 2005 (JP) ............................ 2005-021134

(51) Int. Cl.
*B60Q 1/00* (2006.01)
*F21V 7/00* (2006.01)

(52) U.S. Cl. ........................ 362/539; 362/538; 362/296

(58) Field of Classification Search ................. 362/520, 362/521, 538, 539, 296, 297, 346
See application file for complete search history.

(56) References Cited

U.S. PATENT DOCUMENTS 4,797,790 A * 1/1989 Brodling et al. ............. 362/538
6,155,702 A * 12/2000 Blusseau et al. ............ 362/520
6,953,272 B2 10/2005 Hayakawa et al.

FOREIGN PATENT DOCUMENTS

JP 2003151319 5/2003

* cited by examiner

*Primary Examiner*—John A Ward
(74) *Attorney, Agent, or Firm*—Cermak Kenealy & Vaidya LLP

(57) ABSTRACT

A vehicle light can include a projector type unit and an ellipse-parabola combined unit that surrounds a light source. Part of the light from the light source is directed toward a projector lens by part of an ellipse group reflecting portion of the projector type unit. The remainder of the light is directed toward a parabolic group reflecting portion of the ellipse-parabola combined unit by the ellipse group reflecting portion of the ellipse-parabola combined unit via openings. This parabolic group reflecting portion then directs the light to its illumination direction. This can improve light utilization efficiency, and the entire front face of the vehicle light can be lit without deteriorating from the vehicle light's light distribution.

8 Claims, 6 Drawing Sheets

VEHICLE LIGHT

This application claims the priority benefit under 35 U.S.C. §119 of Japanese Patent Application No. 2005-021134 filed on Jan. 28, 2005, which is hereby incorporated in its entirety by reference.

BACKGROUND OF THE INVENTION

1. Field of the Invention

The invention relates to a vehicle light for illumination, such as a headlight, indication light, tail light, fog light, etc. In particular, the invention relates to a vehicle light suitable for a vehicle headlight in which a basic projector type headlight is provided with additional ellipse group reflecting portions and additional parabolic group reflecting portions to effectively utilize light which has not been used by the conventional projector type headlight. This configuration can provide a high luminous flux capture rate (or light utilization efficiency) for a vehicle headlight which can result in a high level of luminance.

2. Description of the Related Art

FIG. 1 shows an exemplary configuration of a conventional projector type headlight 90 with additional reflectors 81 to 84 provided in order to increase the light amount emitted therefrom (for example, see the headlight disclosed in both Japanese Patent Laid-Open Publication No. 2003-151319 and family patent member U.S. application No. 2003/008277, the disclosures of which are hereby incorporated in their entirety by reference). The projector type headlight 90 has a main reflector 92 that comprises an ellipse group reflecting portion such as a revolved ellipsoid. The main reflector 92 has a first focus f1 and a second focus f2. A light source 91 such as a metal halide discharge light is provided approximately at the position of the first focus f1. The main reflector 92 is arranged such that the second focus f2 is located in front of the first focus f1 on the illumination axis X.

A projection lens 93 is arranged in front of the second focus f2 of the main reflector 92 on the illumination axis X and has a focus located approximately at the position of the second focus f2. A movable shielding plate 94 is arranged in the vicinity of the second focus f2 such that the lower half of the reflected light from the main reflector 92 can be appropriately shielded. The shielding plate 94 can move between the low-beam position and the high-beam position. When the shielding plate 94 is at the low-beam position, upward light can be shielded thereby to obtain a low-beam distribution. When the shielding plate 94 is at the high-beam position, upward light is not shielded in order to obtain a high-beam distribution.

In addition to the basic configuration of the projector type headlight 90 described above, the additional reflectors 81 to 84 are provided, which will be described later, to increase the light amount. In this description related to the conventional art, the right and left directions are defined based on the illumination direction seen from the light source 91 side.

One of the additional reflectors, or a first right additional reflector 81, is arranged at the position between the main reflector 92 and the projection lens 93 where there is no obstacle such as a shielding plate 94 or the like, and at the upper portion where only direct light from the light source 91 reaches. The reflector 81 has a first focus f1 and a second focus f3R. The reflector 81 is arranged such that the first focus f1 is positioned approximately at the light source 91 and the second focus f3R is positioned leftward and below the illumination axis X.

A second left additional reflector 82 is provided at the position near the lower left portion of the projector type headlight 90. The reflector 82 has a focus positioned approximately at the second focus f3R of the reflector 81 with its reflection direction being generally parallel to the illumination axis X.

In addition, a first left additional reflector 83 and a second right reflector 84 are provided symmetrically with respect to the first right additional reflector 81 and the second left additional reflector 82.

Incidentally, in the conventional example, auxiliary shielding plates are provided between the first right additional reflector 81 and the second left additional reflector 82 and between the first left additional reflector 83 and the second right additional reflector 84, respectively. They are opened and closed in cooperation with the movable shielding plate 94.

When the movable shielding plate 94 takes the high-beam position, or in the high-beam distribution state in the conventional headlight 90, the light amount can be increased by the amount captured by the first right additional reflector 81 and the first left additional reflector 83.

However, the vehicle light with the conventional configuration has the following problems. First, the first right and left additional reflectors 81 and 83 can capture only a part of light which is not captured by the main reflector, namely they reflect only a part of the light which is not effectively used. This is because the positional interference should be avoided when arranging the second reflectors 82 and 84. Thus, the light amount increased by the afore-mentioned configuration of the vehicle light is not sufficient with respect to the complexity of the configuration of the vehicle headlight. Thus, the cost performance is not satisfactory.

Another problem is that the reflecting surfaces of the first right and left additional reflectors 81 and 83 are inevitably directed toward the light source because the reflectors 81 and 83 must directly capture the light from the light source. Namely, when the vehicle light is seen from the front, the rear sides of the reflectors 81 and 83 are directly observed. These areas are not lit when the light source is turned on, resulting in a strange or uneven light that might be bothersome for viewers. In addition, the lit portion corresponding to the projection lens is separated from those corresponding to the second right and left additional reflectors. This also results in a possibly strange or uneven light that may not meet aesthetic desires.

SUMMARY OF THE INVENTION

In view of the foregoing and other factors and, in accordance with an aspect of the invention, a vehicle light can include a light source, a projector type unit including a projector ellipse group reflecting portion having a first focus at a position near the light source and a second focus, a projection lens having a focus at a position near the second focus of the projector ellipse group reflecting portion, and a shielding plate for shielding light from the light source when a low-beam distribution is formed. The projector type unit can direct light from the light source to the projection lens to emit light therefrom. An ellipse-parabola combined unit for emitting light from the light source, including at least one pair of a light-collecting ellipse group reflecting portion and a projector parabolic group reflecting portion, can be provided. The light-collecting ellipse group reflecting portion can have a first focus at a position near the light source and a second focus. The projector parabolic group reflecting portion can have a focus at a position near the second focus of the light-collecting ellipse group reflecting portion corresponding to the light-collecting ellipse group reflecting portion. A light outlet opening can be provided in a light-collecting ellipse group reflecting portion positioned near the second focus of the light-collecting ellipse group reflecting portion for the light reflected by the light-collecting ellipse group reflecting portion to pass therethrough and to the outside toward the projector parabolic group reflecting portion. A projection mirror holder can be provided for arranging the projector parabolic group reflecting portion in order to direct the light from the light outlet opening in a direction of illumination.

In this configuration, the projector ellipse group reflecting portion and the light-collecting ellipse group reflecting portion can constitute an internal mirror assembly such that it enclosingly surrounds the light source. As a result, when the light source is turned on, substantially the entire face of the vehicle light, when seen from its front, can be lit by a combination of the projector type unit and the ellipse-parabola combined unit.

In the thus configured vehicle light embodiment, approximately 30% of light from the light source may be distributed to the projector type unit to form a basic light distribution of the vehicle light. In this case, an area and a position of the light-collecting ellipse group reflecting portion of the ellipse-parabola combined unit and an illumination direction and a light distribution of the projector parabolic group reflecting portion of the ellipse-parabola combined unit can be set such that the basic light distribution of the vehicle light formed by the projector type unit is not deteriorated. As a result, light utilization efficiency with respect to the light source can be increased by approximately 1.5 times that in a case where only the projector type unit is utilized.

In the above-described vehicle light, the internal mirror assembly may be formed by separate left, right, and upper members, and the shielding plate may be provided within the internal mirror assembly.

In the above vehicle light embodiment, a projector lens collecting member may be provided at a position near the second focus of the projector ellipse group reflecting portion to reflect light directed to an area outside of the projector lens from the projector ellipse group reflecting portion toward the projector lens.

In accordance with another aspect of the invention, the vehicle light can be configured such that the light source is almost entirely surrounded by the internal mirror assembly composed of ellipse group reflecting portions. The thus configured internal mirror assembly can capture almost all of the light from the light source such that the light can be used as illumination light of the vehicle light. This can increase the higher light intensity by approximately 1.5 times the conventional vehicle light (in one example), thereby improving the visibility and performance of the vehicle light.

In accordance with another aspect of the invention, the internal mirror assembly can include a plurality of ellipse group reflecting portions that can capture almost all of the light from the light source by surrounding the light source. Furthermore, the projection lens can be located at the front end of the internal mirror assembly. In addition, the projector parabolic group reflecting portions can be configured to surround the internal mirror assembly for reflecting light from the internal mirror assembly through the light outlet opening. Thus, when the light source is turned on, the front face of the vehicle light as a whole is lit, thereby providing a confident light to viewers and improving the aesthetic property of the light.

In accordance with another aspect of the invention, a vehicle light can include a light source, a projector ellipse group reflecting portion having a first focus located substantially at the light source, and a second focus. The light can also include a projection lens having a focus located substantially at the second focus of the projector ellipse group reflecting portion, and a light-collecting ellipse group reflecting portion having a first focus located substantially at the light source, and a second focus. A projector parabolic group reflecting portion can also be provide and have a focus located substantially at the second focus of the light-collecting ellipse group reflecting portion, wherein the light-collecting ellipse group reflecting portion includes a light outlet opening that permits light reflected by the light-collecting ellipse group reflecting portion to pass through the outlet opening and toward the projector parabolic group reflecting portion.

The light-collecting ellipse group reflecting portion can include a left portion having a left portion second focus, and a right portion having a right portion second focus. The left portion can include a left outlet opening located substantially at the right portion second focus. The right portion can include a right outlet opening located substantially at the left portion second focus. The right and left portions can each include a plurality of separate ellipse shaped mirror portions, and each of the separate ellipse shaped mirror portions can include an outlet opening. The projector ellipse group reflecting portion and the light collecting ellipse group reflecting portion can form a continuous mirrored surface that encircles the light source. A projector lens collecting member can be located adjacent the projection lens and configured to redirect light, emitted from both the projector ellipse group reflecting portion and the light-collecting ellipse group reflecting portion, toward the projector lens. In addition, an attachment structure can be provided and configured to attach the left portion of the light-collecting ellipse group reflecting portion to the right portion of the light-collecting ellipse group reflecting portion.

In accordance with yet another aspect of the invention, a vehicle light can include a light source, and an internal mirror assembly located adjacent the light source. The internal mirror assembly can include at least one light-collecting ellipse group reflecting portion having an outlet opening therein and a projection mirror holder located adjacent the internal mirror assembly. The projection mirror holder can include a projection parabolic group reflecting portion configured to reflect light that passes through the outlet opening and is emitted from the light source.

The internal mirror assembly can include left and right side members each having a left and right side projector ellipse group portion, and left and right side light-collecting ellipse group portion, respectively. The left and right side light-collecting ellipse group portions can each include a left and right side outlet opening, respectively. The left side member and the right side member can be attached to each other via an attachment structure, such as screws, fasteners, adhesives, welds, and the like. The vehicle light can also include a projection lens located adjacent the internal mirror assembly, wherein the internal mirror assembly includes a projector ellipse group reflecting portion configured to direct light emitted from the light source towards the projection lens. A projector lens collecting member can be located adjacent the projection lens and configured to reflect and redirect light that has been previously reflected by the projector ellipse group reflecting portion and that is not directed towards the projection lens, towards the projection lens.

BRIEF DESCRIPTION OF THE DRAWINGS

These and other characteristics and features of the invention will become clear from the following description with reference to the accompanying drawings, wherein.

DETAILED DESCRIPTION OF PREFERRED EMBODIMENTS

Figure 1:
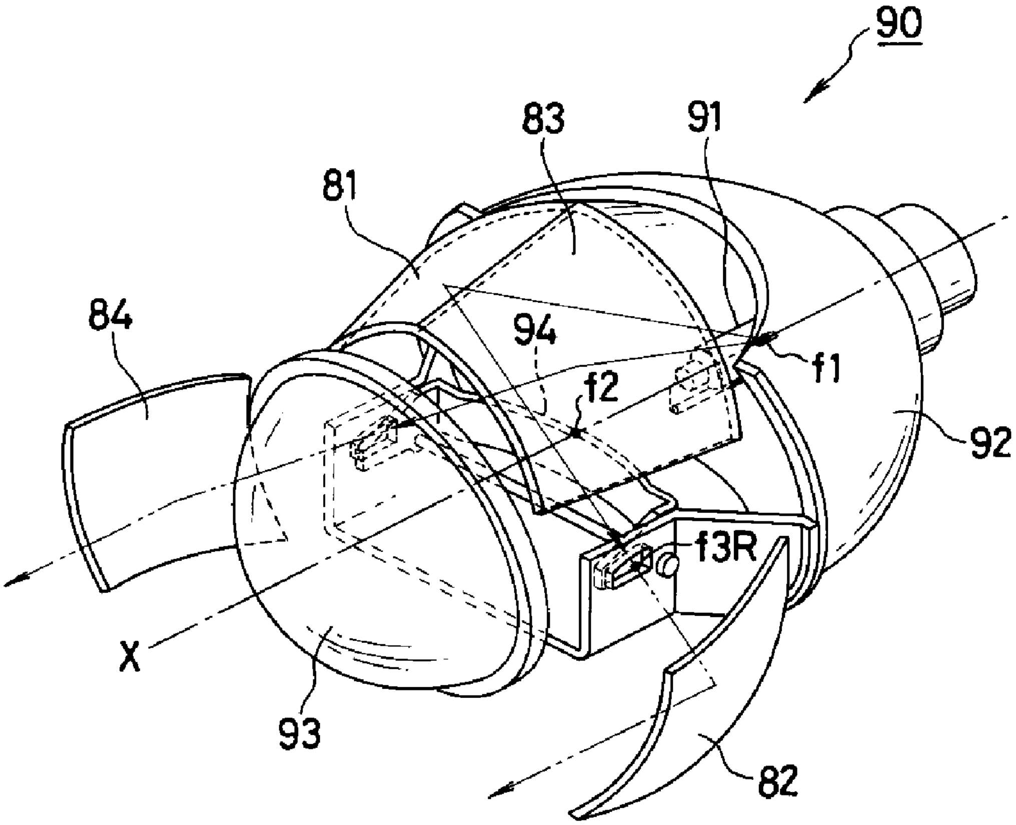
Fig. 1 Conventional Art
FIG. 1 is a perspective view showing a conventional exemplary vehicle headlight.
Figure 2:
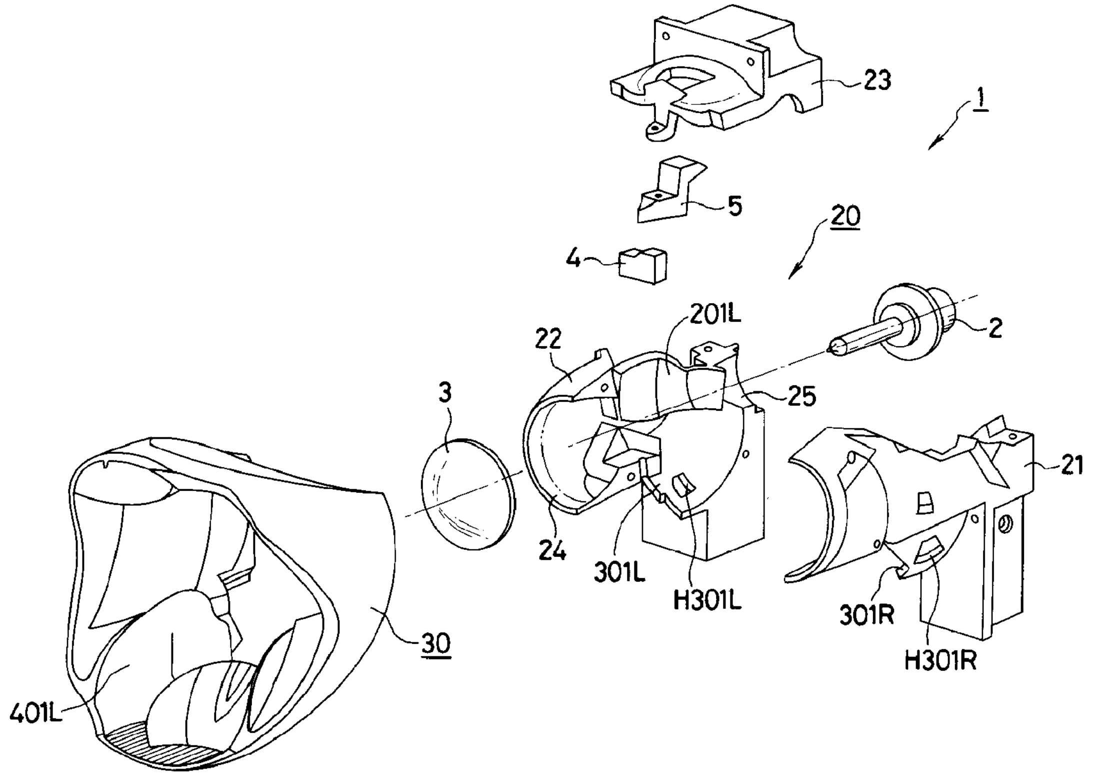
FIG. 2 is a perspective partially disassembled view showing an embodiment of a vehicle headlight made in accordance with principles of the invention.

Next, the invention will be described with reference to the accompanying drawings based on some exemplary embodiments. In FIG. 2, the reference numeral 1 denotes a vehicle headlight. This vehicle headlight 1 can be mainly composed of an internal mirror assembly 20 and a projection mirror holder 30 which is a type of housing for surrounding the internal mirror assembly 20.

The internal mirror assembly 20 is mainly composed of a right-side member 21, a left-side member 22, and an upper member 23. They can be integrated by an attachment structure such as means for screwing, other fasteners, welds, adhesives, or the like, in order to assemble the internal mirror assembly 20 as a unit. When the internal mirror assembly 20 is completed, the front portion thereof can serve as a projection lens holder 24 and a light source mounting hole 25 can be formed in the rear portion thereof.

The thus assembled internal mirror assembly 20 serves as a projector type unit 10 in order to capture the light from the light source 2 and deliver it to the projection parabolic group reflecting portions (described later with reference to FIG. 6 and denoted by the reference numerals 401 to 406) provided in the projection mirror holder 30. A light shielding plate (or shade) 4 can be provided inside the internal mirror assembly 20. A projection lens 3 can be attached to the projection lens holder 24, and a light source 2 can be attached to the light source mounting hole 25.

Accordingly, right and left projector ellipse group reflecting portions 201R and 201L for use in the projector type unit 10, and light-collecting ellipse group reflecting portions for use in an ellipse-parabola combined unit (described later with reference to FIG. 5 and denoted by the reference numerals 301 to 305 (R and L)) can both be provided in the internal mirror assembly 20. Incidentally, the right and left directions are based on a view of the vehicle light 1 from the front, and as seen from a direction opposed to the light source 2 (i.e., as seen from the front side). The front and rear directions are based on the illumination direction. The upper and lower directions are based on the state where the vehicle light 1 is installed in a vehicle.

Next, a configuration of an embodiment of the projector type unit 10 will be described. As described with respect to the conventional art, the conventional headlight has reflectors with simple shapes in which a revolved ellipsoid is cut in a direction perpendicular to the short axis to provide the maximum cross section.

However, according to the above conventional configuration almost all of the light reflected by the lower half of the ellipse reflecting portion may be shielded by the light shielding plate 4. Thus, the reflector provided in this area may not be effective, and the light utilization efficiency may not be sufficient. For example, part of the reflected light which has not been shielded by the light shielding plate 4 from the light source 2 cannot enter the projection lens 3, or only illuminates the road surface just before the vehicle. In order to solve the problems described above as well as other problems, it has been confirmed that the light utilization efficiency can be increased and/or other features can be realized by using an ellipse-parabola combined unit and/or other features (described in more detail below).

Figure 3:
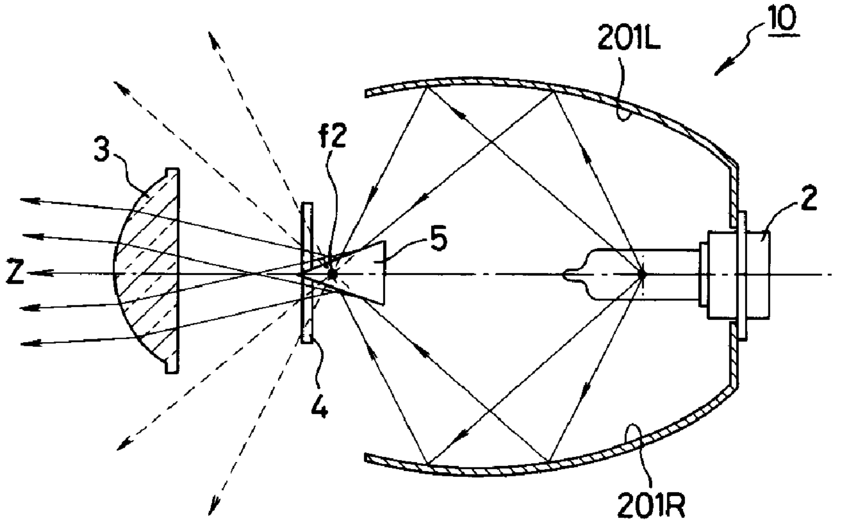
FIG. 3 is an explanatory view schematically showing the configuration of an embodiment of a projector type unit provided within an internal mirror assembly made in accordance with principles of the invention.

FIG. 3 schematically shows part of a projector type unit 10 that can be provided inside the internal mirror assembly. The right-side member 21 and the left-side member 22 can be provided in the internal mirror assembly 20 and in lateral directions with respect to the light source 2. In the members 21 and 22, projector ellipse group reflecting portions 201R and 201L can be formed, which each have a first focus approximately at the position of the light source 2.

The projector ellipse group reflecting portion 201R and 201L described above can be manufactured by separately forming the right-side member 21 and the left-side member 22. This means there is no need to release the product from the mold halves in the Z-axis direction of the light source 2 when molding, and the members 21 and 22 can be separately produced by releasing each of them laterally. Accordingly, the degree of freedom for molding can be increased. The increased degree of freedom may allow the formation of light-collecting ellipse group reflecting portions 301R and 301L which are arranged below the projector ellipse group reflecting portions 201R and 201L. These light-collecting ellipse group reflecting portions 301R and 301L will be described in more detail below. The projector ellipse group reflecting portions 201R and 201L can be located only in a certain specific areas. Thus, the shielding plate 4 may be present only in an area where light from the projector ellipse group reflecting portions 201R and 201L reaches. This arrangement can decrease the size of the entire vehicle light.

Figure 5:
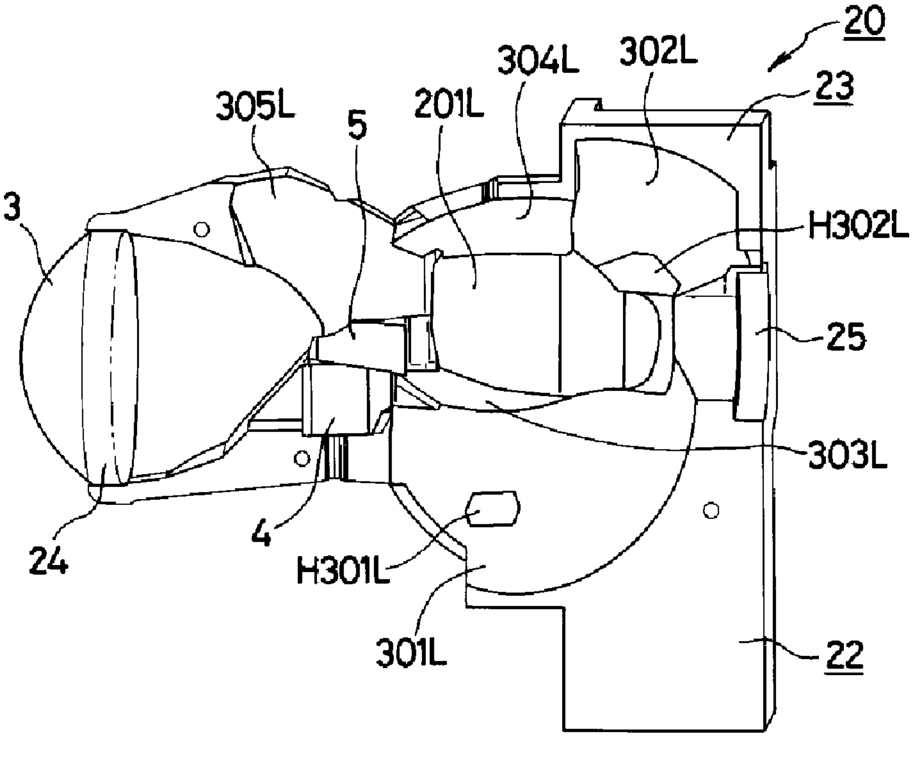
FIG. 5 is an explanatory view showing a configuration of an embodiment of an internal mirror assembly of a vehicle headlight made in accordance with principles of the invention.

A projector lens collecting member 5 can have a wedge shape and be provided above the shielding plate 4 in an area where light from the projector ellipse group reflecting portions 201R and 201L reaches, as shown in FIGS. 3 and 5. This arrangement can also decrease the size of the entire vehicle light. Incidentally, the projector lens collecting member 5 is referred to simply as a "wedge" hereinafter. Namely, the wedge 5 can be arranged in the vicinity of the second focus f2 of the projector ellipse group reflecting portions 201R and 201L. This arrangement can cause light which converges at the second focus f2 and reaches the area outside the projector lens 3 to be reflected at the side faces of the wedge 5. Thus, the wedge 5 can cause light to be directed toward the projector lens 3, thereby making light enter the projector lens 3.

The wedge 5 can be configured such that the projection lens 3 may be reduced in size, thereby decreasing the entire size of the vehicle light 1. In addition, when the right and left-side members 21 and 22 are integrally assembled, the front portion of the internal mirror assembly 20 can serve as the projection lens holder 24 for holding the projection lens 3.

The conventional reflecting portion is formed by press working of a plate material to be formed into a revolved ellipsoid, including portions which reflect light upward or downward, which light is unnecessary in terms of light distribution. In contrast, in accordance with an embodiment of the invention, a light-collecting ellipse group reflecting portions can replace the conventional reflecting portions. These light-collecting ellipse group reflecting portions can be composed of a plurality of ellipse group reflecting portions each of which has the first focus approximately at the position of the light source 2 and is used in combination with a corresponding parabolic group reflecting portion having a focus at the position of the second focus of the ellipse group reflecting portion. The details thereof will be described in more detail below.

As described above, the conventional vehicle headlight can include the first to fourth additional reflectors 81 to 84 provided at portions where the ellipse group main reflector 92 cannot capture the light, thereby improving the luminous flux capture rate. According to an embodiment of the invention, the ellipse-parabola combined unit (see FIG. 7) can be composed of light-collecting ellipse group reflecting portions (301 to 305) and projection parabolic group reflecting portions and can be provided at portions where light from the light source 2 can be effectively utilized even where the conventional main reflector 92 captures light. This can improve the efficiency as a vehicle headlight.

Figure 4:
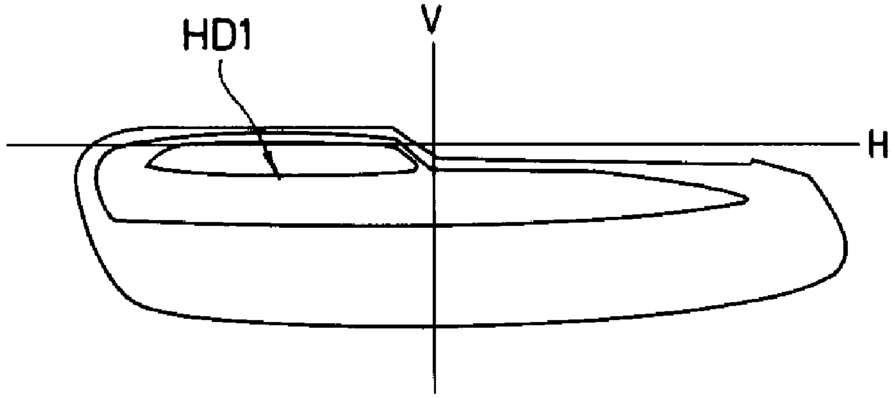
FIG. 4 is a graph showing the light distribution characteristics formed by an embodiment of a projector type unit made in accordance with principles of the invention.

FIG. 4 shows a light distribution HD1 which is formed by the light source 2, the right and left projector ellipse group reflecting portions 201R and 201L, the shielding plate 4, the wedge 5, and the projector lens 3, namely, by the projector type unit 10. In this exemplary embodiment, the basic light distribution is formed so as not to generate any upward light in the right half side, or the opposed vehicle side (in the case of left-hand traveling traffic).

Hereinafter, in order to complementally increase the light utilization efficiency with regard to the above-mentioned basic light distribution, the ellipse-parabola combined unit composed of the light-collecting ellipse group reflecting portions (for example, 301) and the projection parabolic group reflecting portions (for example, 402 described below) is adopted. The ellipse-parabola combined unit may be configured such that the light reflected thereby is directed so as to improve the light distribution, for example, to increase the light intensity at the center of the light distribution HD1, or to widen the illumination area without deteriorating the basic distribution shape.

FIG. 5 is a partially cut-away sectional view showing an exemplary embodiment of the configuration of an internal mirror assembly 20, in which the left-side member 22 and the upper member 23 are assembled. Here, the explanation will be focused on the left half of the assembly 20. The internal mirror assembly 20 can be provided with the projector ellipse group reflecting portion 201L as well as first to fifth light-collecting ellipse group reflecting portions 301L to 305L.

The projector ellipse group reflecting portion 201L and the first to fifth light-collecting ellipse group reflecting portions 301L to 305L can each have its first focus in the vicinity of the light source 2 and can each be composed of a part of a revolved ellipsoid. In other words, the light source 2 may be entirely surrounded by these reflecting portions 201L (and 201R) and 301L to 305L (and 301R to 305R). In this state, thus, there are no light paths to the outside for light reflected by the projector ellipse group reflecting portion 201L (and 201R) other than the light path from the reflecting portion 201L via the projection lens 3 to the outside.

Hereinafter, an exemplary embodiment will be described in which a light outlet H301L is provided in the left half portion corresponding to the first light-collecting ellipse group reflecting portion 301R which is not shown in the drawing and can be symmetrically positioned with respect to the first light-collecting ellipse group reflecting portion 301L. The light from the light source 2 (approximately at the first focus) is reflected by the first light-collecting ellipse group reflecting portion 301R to be converged at the second focus thereof. In this exemplary embodiment, the first light-collecting ellipse group reflecting portion 301R is configured such that the second focus thereof is positioned near the reflecting surface of the opposed reflecting portion 301L, where the light outlet H301L is provided. The light outlet H301L is formed as a small sized hole which is sufficient for the reflected and converged light to pass therethrough to the outside. Accordingly, the formation of the light outlet H301L does not sacrifice the effective reflecting area of the reflecting portion. Incidentally, the right half configuration including a light outlet H301R which corresponds to the reflecting portion 301L can have the same configuration as well as the same way that the light is directed to pass therethrough, and thus the description thereof is omitted here.

In the same way, the light reflected by each of the second to fifth light-collecting ellipse group reflecting portions 302 to 305 (R and L) can pass through the corresponding light outlet provided in the corresponding reflecting portion near the second focus thereof to be directed outside the internal mirror assembly 20. The shapes and the positions of the light-collecting ellipse group reflecting portions and the corresponding light outlet (for example, 301L and H301L, and 301R and H301R) are not limited exactly to the described exemplary embodiment. Namely, the reflecting portions and the corresponding light outlet can be provided with respective appropriate shapes and positions in accordance with the purpose of the vehicle headlight 1, such as in the case of left-hand (or right-hand) traffic.

Figure 6:
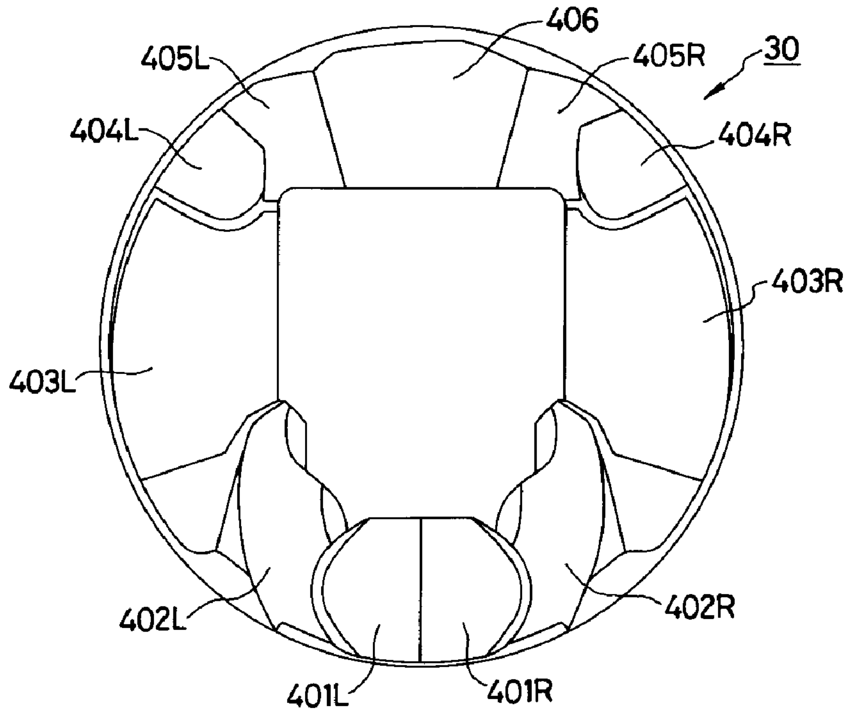
FIG. 6 is a front view showing an embodiment of a projection mirror holder made in accordance with principles of the invention.

FIG. 6 is a front view showing a projection mirror holder 30, which can surround the internal mirror assembly 20. The light from the light source 2 is reflected by the light-collecting ellipse group reflecting portion (301 to 305 (R and L)) to pass through the corresponding light outlet (such as outlet H301 (R and L)). Thus, the inside surface of the projection mirror holder 30 can be provided with the same number of projector parabolic group reflecting portions as that of the corresponding light-collecting ellipse group reflection portions, thereby causing the light to be directed toward the illumination direction. The projection mirror holder 30 can be integrally fixed to the internal mirror assembly 20 by screwing or the like, such as clamps, adhesives, moldings, welds, etc. In addition, one or more outlet openings, such as H301, can be provided in all or some of the light collecting ellipse group portions, depending on the application and style of light.

The shape of the projection mirror holder 30, when seen from the front, can be circular or other suitable shapes in accordance with the design of the vehicle body, such as oval and rectangle. The position, number, and the like, of the light-collecting ellipse group reflecting portion or projector parabolic group reflecting portion can be altered in accordance with the shape of the projection mirror holder 30.

According to an exemplary embodiment, the projector parabolic group reflecting portions (401 to 405) are provided in number equal to that of the light-collecting ellipse group reflecting portions (301 to 305), thereby constituting the ellipse-parabola combined unit.

Incidentally, all of the reflecting portions provided in the projection mirror holder 30 need not be associated with the light-collecting ellipse group reflecting portion (such as 301 to 305). For example, a reflecting portion 406 can be provided at the uppermost portion of the projection mirror holder 30 in the installation state. The reflecting portion 406 shown is a parabolic group reflecting portion with a focus at the position of the light source 2 such that it reflects direct light from the light source 2 to the illumination direction.

Figure 7:
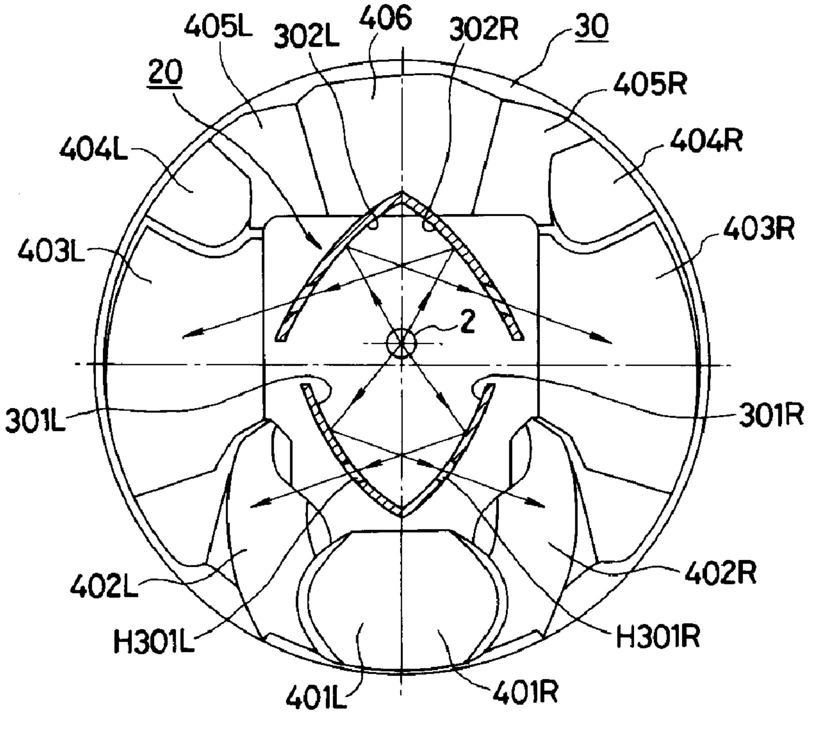
FIG. 7 is an explanatory view showing an example of a light transmitting system between the internal mirror assembly and a projection mirror holder for a vehicle headlight made in accordance with principles of the invention.

FIG. 7 shows light paths from the internal mirror assembly 20 to the projection mirror holder 30. The shown exemplary embodiment includes light paths when the direct light from the light source 2 is reflected by the first light-collecting ellipse group reflecting portion 301 (R or L) and the second light-collecting ellipse group reflecting portion 302 (R or L).

In accordance with this configuration, light from the light source 2 is reflected by the first light-collecting ellipse group reflecting portion 301R to pass through the light outlet H301L provided in the corresponding first light-collecting ellipse group reflecting portion 301L, and to the outside of the internal mirror assembly 20. Then, the reflected light from the reflecting portion 301R reaches the first projector parabolic group reflecting portion 402L which is provided in the projection mirror holder 30, and in turn is reflected again by the reflecting portion 402L to be emitted in the illumination direction of the vehicle headlight 1.

In the same way, light is reflected by the first light-collecting ellipse group reflecting portion 301L to pass through the light outlet H301R provided in the corresponding first light-collecting ellipse group reflecting portion 301R, and to the outside of the internal mirror assembly 20. Then, the reflected light from the reflecting portion 301L reaches the first projector parabolic group reflecting portion 402R which is provided in the projection mirror holder 30, and in turn is reflected again by the reflecting portion 402R to be emitted in the illumination direction of the vehicle headlight 1.

Figure 8:
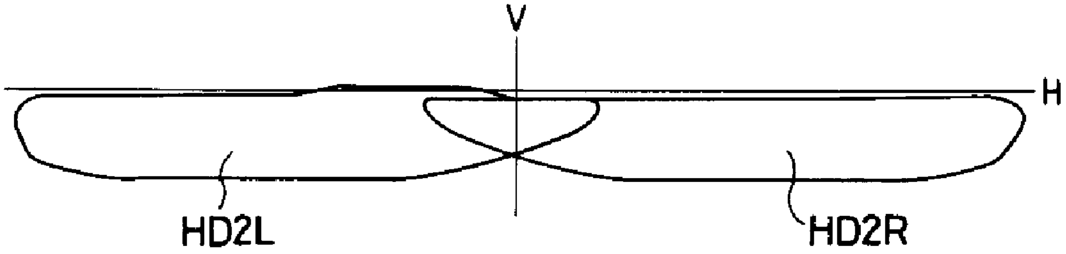
FIG. 8 is an explanatory view showing an exemplary light distribution obtained by a combination of a first light-collecting ellipse group reflecting portion and a first projection parabolic group reflecting portion.
Figure 9:
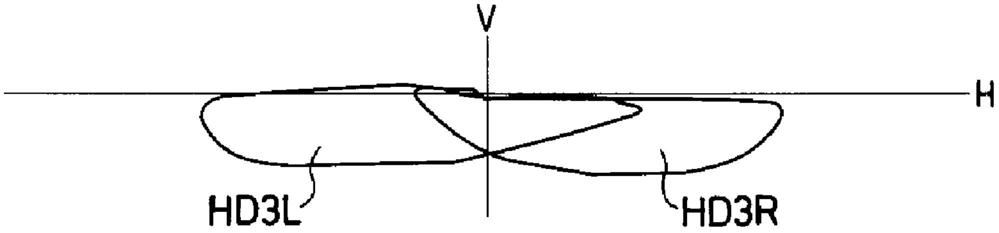
FIG. 9 is an explanatory view showing an exemplary light distribution obtained by a combination of a third light-collecting ellipse group reflecting portion and a third projection parabolic group reflecting portion.

In the above case, the light travels the light path from the light source 2 via the first light-collecting ellipse group reflecting portion 301R and the light outlet H301L to the first projector parabolic group reflecting portion 402L. Then, the light reflected by the reflecting portion 402L is directed in the illumination direction to form the right-side light distribution HD2R as shown in FIG. 8 seen toward the illumination direction. In the same symmetrical way, the light reaching the first light-collecting ellipse group reflecting portion 301L then travels the similar light path to be projected so as to form the left-side light distribution HD2L as shown in FIG. 8. The light distributed as the light distribution HD2L from the ellipse-parabola combined unit is combined with the basic light distribution HD1 of the projector type unit 10, thereby increasing the entire light intensity and widening the illumination area (or viewing angle) without deteriorating the basic distribution shape for use in a vehicle headlight.

In the same way, light reflected by the third light-collecting ellipse group reflecting portion 302 (R or L) can reach the third projector parabolic group reflecting portion 403 (R or L) via the light outlet H302 (R or L) as shown in FIG. 7, to form a light distribution HD3 (R or L). This in turn can be combined with the light distributions HD1 and HD2 (R or L) to increase the illumination light intensity without deteriorating the basic distribution shape for use in a vehicle headlight.

In the above description, the light distribution HD2 formed by the combination of the first light-collecting ellipse group reflecting portion 301 (R or L) and the first projector parabolic group reflecting portion 402 (R or L) is symmetrically formed. Also the distribution HD3 formed by the combination of the second light-collecting ellipse group reflecting portion 302 (R or L) and the third projector parabolic group reflecting portion 403 (R or L) is symmetrically formed. However, the invention is not limited thereto, and may be asymmetrically configured in accordance with the purpose of the vehicle headlight 1, such as in the case of left-hand (or right-hand) traffic.

Figure 10:
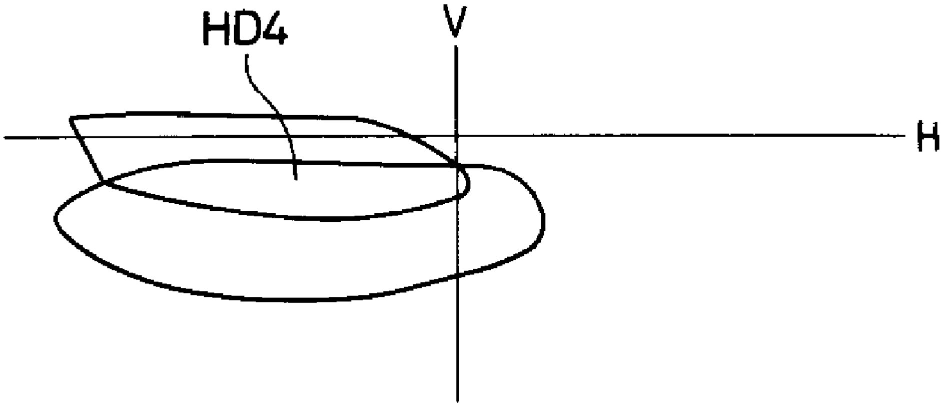
FIG. 10 is an explanatory view showing an exemplary light distribution obtained by a combination of a light-collecting ellipse group reflecting portion and a projection parabolic group reflecting portion, in which the light distribution is asymmetric in shape.

An example providing the asymmetrical distribution shape will be described as the light distribution HD4 shown in FIG. 10. In this case, the light from the light source 2 which is reflected by the third light-collecting ellipse group reflecting portion 303 (R or L) can be reflected by the fifth projector parabolic group reflecting portion 405 (R or L) to be directed in the illumination direction. When this vehicle headlight 1 is used in the left-hand traffic, the reflection direction of the reflecting portion 405 (R and L) can be adjusted to illuminate the left side near the so-called elbow portion to thereby increase the visibility on the road shoulder.

Figure 11:
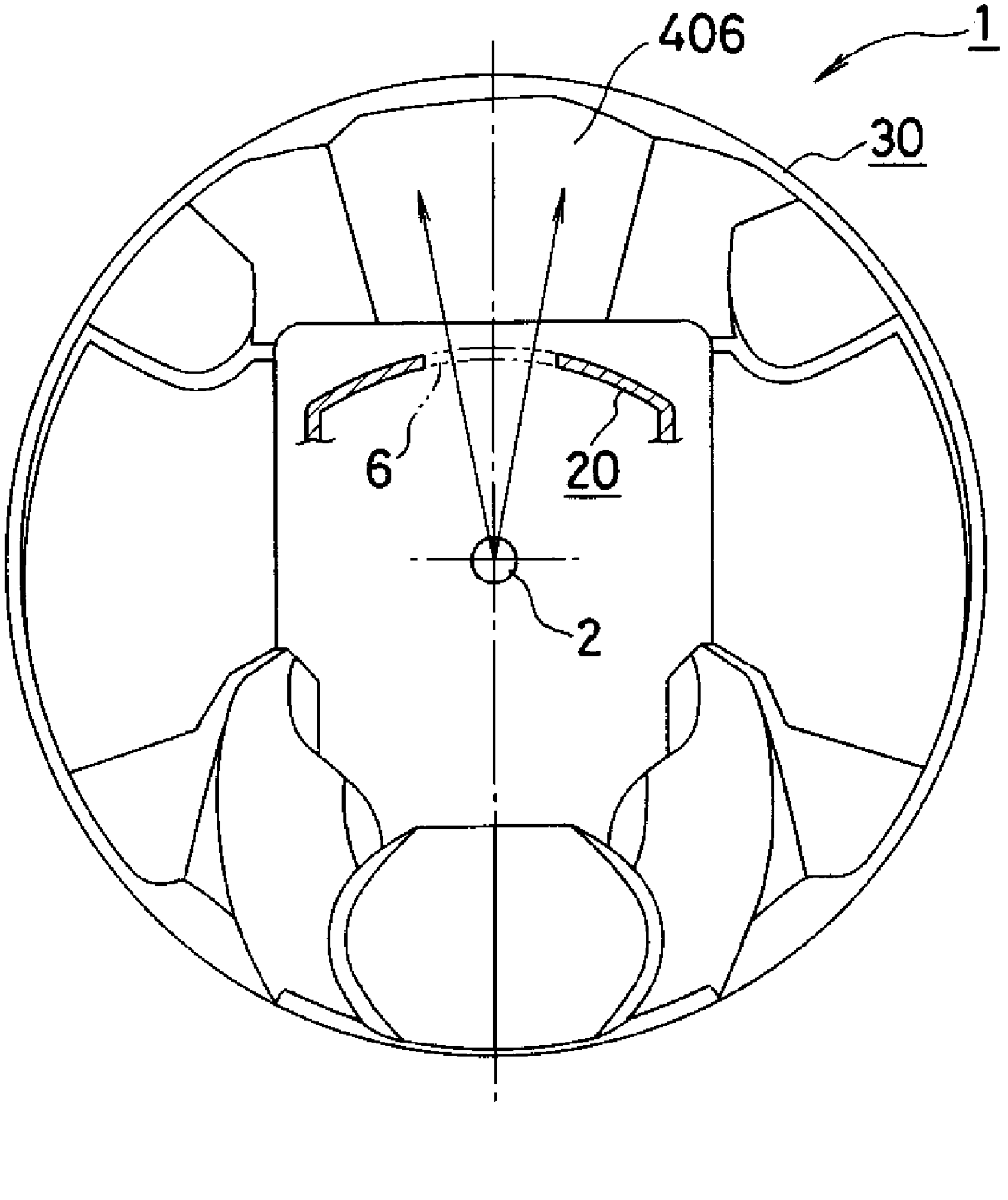
FIG. 11 is an explanatory view showing the action of a parabolic group reflecting portion for direct illumination.

Next, the reflecting portion 406 for direct illumination having a parabolic group reflecting portion will be described. This reflecting portion 406 does not correspond to any light-collecting ellipse group reflecting portion inside the internal mirror assembly 20, and can be formed at an appropriate position within the internal mirror assembly 20, for example, at the upper portion thereof, and can utilize an opening 6 for cooling and to generate illumination light. In this case, the reflecting portion 406 can be a parabolic group reflecting portion with its focus at the light source 2. As shown in FIG. 11, the reflecting portion 406 can be provided in the projection mirror holder 30 at the opening 6. Thus, the light within the internal mirror assembly 20 can be utilized as much as possible for illumination.

The ratio between the light amount distributed to the projector type unit 10 and the light amount distributed to the ellipse-parabola combined unit within the internal mirror assembly 20 can be optimized in order to obtain the highest illumination efficiency for the vehicle headlight 1.

This ratio between the light amount distributed to the projector type unit 10 and the light amount distributed to the ellipse-parabola combined unit within the internal mirror assembly 20 was evaluated within a circular area of approximately 160 mm diameter or equivalent area, which was defined based on the specification for this type of vehicle headlight such as an all-glass sealed beam light. As a result, it was confirmed that, when 30±10% of light from the light source 2 is distributed to the projector type unit 10 and the remainder is distributed to the ellipse-parabola combined unit, the highest illumination efficiency can be obtained.

As described above, the light source 2 can be entirely surrounded by the light-collecting ellipse group reflecting portions (each having its first focus at the position of the light source 2) to capture almost all of the light emitted from the light source 2. Secondly, part of the ellipse group reflecting portions (each having its first focus at the position of the light source 2) can act as a reflecting surface for the projector type unit 10, and the other ellipse group reflecting portions can be combined with the corresponding parabolic group reflecting portions each having its focus at the second focus of the corresponding ellipse group reflecting portion to form the ellipse-parabola combined unit. This configuration can increase the light utilization efficiency. Namely, the headlight 1 can achieve approximately 1.5 times to twice as large light utilization efficiency as compared to the conventional art devices, with respect to the same power consumption. Thus, headlight 1 can enjoy a high level of luminance.

Thirdly, the ellipse-parabola combined unit can be arranged to entirely surround the projector type unit 10. Thus, when the light source is turned on, the entire face of the projection mirror holder 30 is lit to provide an appearance similar to that of a conventional headlight. This appearance is comforting to viewers and provides an aesthetic that instills confidence in the vehicle light.

Incidentally, embodiments of headlights have been described as examples of the invention. However, the invention can also be applied to fog lights, indicator lights, spot lights, rear lights, and other vehicle illumination lights.

While there has been described what are at present considered to be exemplary embodiments of the invention, it will be understood that various modifications may be made thereto, and it is intended that the appended claims cover all such modifications as fall within the true spirit and scope of the invention. All conventional art references described above are herein incorporated in their entirety by reference.

What is claimed is:

1. A vehicle light comprising:

a light source;

a projector type unit including, a projector ellipse group reflecting portion having a first focus located substantially at the light source, and a second focus, a projection lens having a focus located substantially at the second focus of the projector ellipse group reflecting portion, and a shielding plate configured to shield light from the light source to form a low-beam light distribution, the projector type unit configured to direct light from the light source to the projection lens to emit light therefrom; and an ellipse-parabola combined unit configured to emit light from the light source, including, at least one light-collecting ellipse group reflecting portion and a projector parabolic group reflecting portion, the light-collecting ellipse group reflecting portion having a first focus located substantially at the light source and a second focus, the projector parabolic group reflecting portion having a focus located substantially at the second focus of the light-collecting ellipse group reflecting portion, wherein a light outlet opening is provided in the light-collecting ellipse group reflecting portion such that light reflected by the light-collecting ellipse group reflecting portion passes through the outlet opening and toward the projector parabolic group reflecting portion, and a projection mirror holder configured to allow the projector parabolic group reflecting portion to direct the light from the light outlet opening in a direction of illumination, wherein the projector ellipse group reflecting portion and the light-collecting ellipse group reflecting portion constitute an internal mirror assembly enclosingly surrounding the light source.

2. The vehicle light according to claim 1, wherein:

approximately 30% of light from the light source is distributed to the projector type unit to form a basic light distribution for the vehicle light;

an area and a position of the light-collecting ellipse group reflecting portion of the ellipse-parabola combined unit and an illumination direction and a light distribution of the projector parabolic group reflecting portion of the ellipse-parabola combined unit are set such that the basic light distribution of the vehicle light formed by the projector type unit is not deteriorated; and light utilization efficiency with respect to the light source is increased approximately 1.5 times light utilization efficiency for a case where only the projector type unit is utilized.

3. The vehicle light according to claim 1, wherein the internal mirror assembly includes separate left, right, and upper members, and the shielding plate is provided within the internal mirror assembly.

4. The vehicle light according to claim 2, wherein the internal mirror assembly includes separate left, right, and upper members, and the shielding plate is provided within the internal mirror assembly.

5. The vehicle light according to claim 1, wherein a projector lens collecting member is located substantially at the second focus of the projector ellipse group reflecting portion such that the projector lens collecting member reflects light from the projector ellipse group reflecting portion that was previously directed away from the projector lens, toward the projector lens.

6. The vehicle light according to claim 1, wherein the light outlet opening is located substantially at the second focus of the light-collecting ellipse group reflecting portion.

7. The vehicle light according to claim 1, wherein when the light source is turned on, an entire face of the vehicle light, when seen from a front of the vehicle light, is lit by a combination of light emitted from the projector type unit and the ellipse-parabola combined unit.

8. The vehicle light according to claim 1, wherein the at least one light-collecting ellipse group reflecting portion includes a pair of light-collecting ellipse group reflecting portions.

* * * * *